United States Patent [19]

Price et al.

[11] Patent Number: 4,685,541

[45] Date of Patent: Aug. 11, 1987

[54] SELF-ENERGIZING DISC BRAKES

[75] Inventors: Anthony G. Price, Gwent, Wales; Roy Campbell, Worcestershire, England

[73] Assignee: Lucas Industries, Birmingham, England

[21] Appl. No.: 835,172

[22] Filed: Mar. 3, 1986

[30] Foreign Application Priority Data

Mar. 9, 1985 [GB] United Kingdom ............... 8506164

[51] Int. Cl.$^4$ ............................................. F16D 55/04
[52] U.S. Cl. ................................ 188/71.4; 188/106 F; 192/70
[58] Field of Search .................... 188/71.3, 71.4, 72.2, 188/72.6, 106 F, 106 A; 192/70, 85 AB, 93 A, 99 A

[56] References Cited

U.S. PATENT DOCUMENTS

| | | | |
|---|---|---|---|
| 3,392,805 | 7/1968 | Kreitner | 192/70 X |
| 4,241,813 | 12/1980 | Sompele | 188/106 F X |
| 4,358,002 | 11/1982 | Price et al. | 188/72.2 X |

FOREIGN PATENT DOCUMENTS

| | | | |
|---|---|---|---|
| 1273922 | 7/1968 | Fed. Rep. of Germany | 188/72.2 |
| 1937770 | 2/1971 | Fed. Rep. of Germany | 188/71.4 |
| 2737301 | 2/1978 | Fed. Rep. of Germany | 188/72.2 |
| 2640304 | 3/1978 | Fed. Rep. of Germany | 188/71.4 |
| 726594 | 3/1955 | United Kingdom | 188/106 F |
| 913624 | 12/1962 | United Kingdom | 188/71.4 |
| 1022974 | 3/1966 | United Kingdom | 188/106 F |

Primary Examiner—George E. A. Halvosa
Attorney, Agent, or Firm—Oldham, Oldham & Weber Co.

[57] ABSTRACT

A self-energizing disc brake of the spreading type is provided with an actuator unit incorporating an hydraulically-operable mechanism and a mechanically-operable mechanism. The unit comprises a member which is detachably secured to the housing of the brake and provides a mounting for both mechanisms which extend into the housing through a common opening. The hydraulically-operable mechanism comprises a cylinder in which work opposed pistons acting to separate lugs on the pressure plates and the mechanically-operable mechanism may take any convenient form. The cylinder is tangentially arranged with respect to the plates.

20 Claims, 10 Drawing Figures

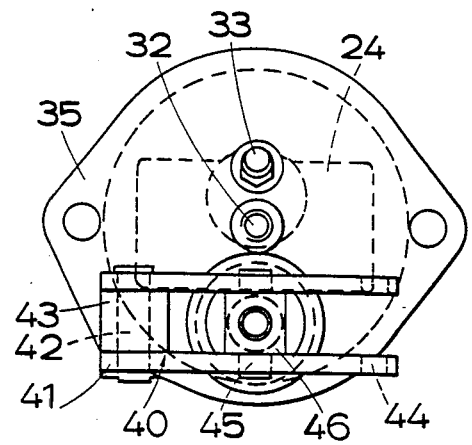
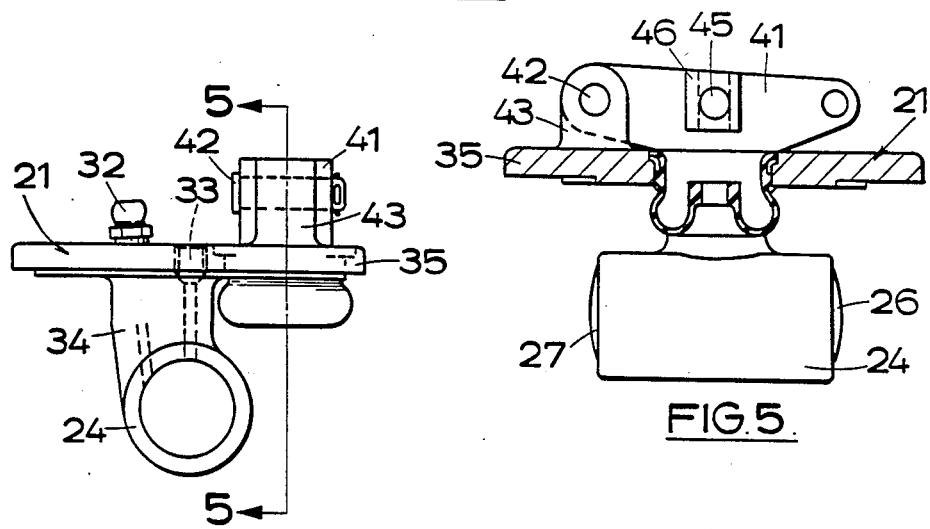

SELF-ENERGIZING DISC BRAKES

This invention relates to self-eneragising disc brakes of the kind in which rotatable friction discs provided with linings of friction material are adapted to be brought into engagement with spaced oppposed braking surfaces in a housing by pressure plates located between the friction discs and centred by stationary pilot lugs, balls or rollers are located in co-operating oppositely inclined recesses in the adjacent faces of the pressure plates, and the application of the brake is initiated by moving the pressure plates angularly in opposite directions, the pressure plates then moving apart, due to the tendency for the balls or rollers to ride up ramps defined by the edges of the recesses, and into engagement with the friction discs which are urged into engagement with the braking surfaces and the pressure plates are carried round with the friction discs until one is arrested by the engagement of a lug on the plate with a drag-taking stop abutment in the housing, the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

It is known to actuate brakes of the kind set forth by hydraulically operable means for normal service braking, and by mechanically operable means for parking or emergency braking. When such means are combined into a single unit, for example as disclosed in GB No. 1 277 345 and GB No. 2 129 512, the hydraulic actuator comprises a stepped piston working in a radial broe in a cylinder member attached to the housing of the brake and acting on the pressure plates through a thrust coupling on a pull-rod which extends, with substantial clearance, through the piston, and the mechanically operable means acts on the pull-rod independently of the piston.

According to our invention, in a self-energising disc brake of the kind set forth provided with an actuator unit incorporating hydraulically-operable means and mechanically-operable means, the unit comprises a member which is secured to the housing and provides a mounting for both said means which extend into the housing through a common radial opening, the hydraulically-operable means acting between lugs on the pressure plates and comprising a cylinder body having a longitudinal bore of which the axis is tangential to the plates and in which works at least one piston for co-operation with one of the lugs.

Preferably the bore extends between opposite ends of the cylinder body and two pistons working in the bore act between the lugs on the plates.

The two means are operable independent of each other which increases reliability and providing a common opening in the housing facilitates machining on existing lines, and allows freedom of choice for the location of the brake input position.

The actuator unit may be detachable mounted on the housing, suitably by the use of detachable bolts for clamping a plate which comprises the said member against a region of the housing which surrounds the radial opening. This improves serviceability and facilitates sealing.

The operation of the brake by the use of a piston and cylinder assembly arranged tangentially offers a low parts inventory at reduced cost, and the direct actuation of the plates for normal service braking improves efficiency.

The mechanically-operable means may be of any convenient construction, including a linkage which is accessible from the exterior of the housing through an opening in the plate.

Preferably, the mechanically-operable means includes suitable means for adjusting the effective length of the linkabe of the mechanically-operable means, and, conveniently, such adjuster means are also accessible from the exterior of the housing.

Some embodiments of our invention are illustrated in the accompanying drawings in which:

FIG. 3 is a plan of the actuator unit incorporated in the brake of FIGS. 1 and 2;

FIG. 4 is an end elevation of the same;

FIG. 5 is a section on the line 5—5 of FIG. 4;

Figure 2:
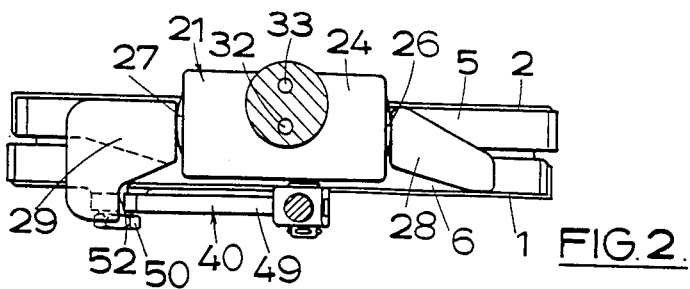
FIG. 2 is a section on the line 2—2 of FIG. 1.
Figure 1:
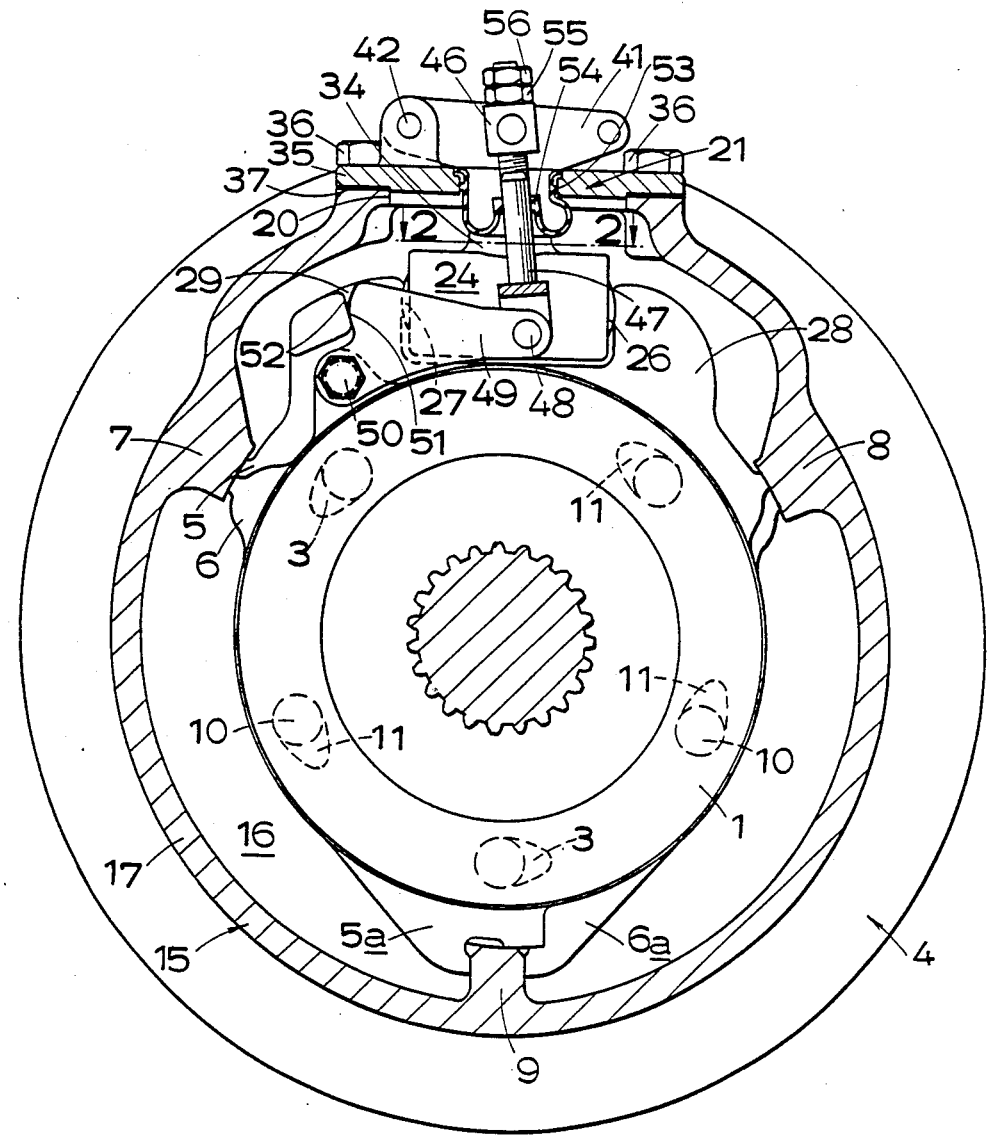
FIG. 1 is an end view of a portion of a spreading brake.

The brake illustrated in FIGS. 1–6 of the drawings is of a conventional spreading type in which two rotatable friction discs 1, 2 provided with friction linings and splined on a shaft are adapted to be brought into engagement with spaced opposed radial braking surfaces in a housing 4 by pressure plates 5, 6 located between the discs 1 and centred by three angularly spaced stationary pilots 7, 8, 9. Balls 10 are located in co-operating oppositely inclined recesses 3 in the adjacent faces of the pressure plates 5, 6.

The application of the brake is initiated by moving the pressure plates 5, 6 angularly in opposite directions which causes the pressure plates 5, 6 to move axially relatively away from each other due to the tendency for the balls 10 to ride up ramps 11 defined by the end faces of the recesses 3. This urges the friction discs 1, 2 into engagement with the braking surfaces in the housing 4. The pressure plates 5, 6 are then carried round with the discs until one is arrested by the engagement of a lug 5a, 6a on a respective plate 5, 6 with a drag-taking abutment constituted by the pilot 9, whereafter continued angular movement of the other plate known as the "servo plate", provides a servo action.

The housing 4 comprises a first member 15 in the form of a casting comprising an end wall 16 of which the inner face constitutes one of the radial braking surfaces, and an integral, axially extending, annular flange constituting a radial wall 17. The open face at the free end of the flange 17 is closed by an end plate, not shown, which is bolted to the member 15 by angularly spaced bolts.

A radial opening 20 in the flange 17 provides a mounting for an actuator unit 21 by means of which the brake is adapted to be applied hydraulically for normal service braking, and mechanically for parking or emergency braking.

As illustrated the unit 21 comprises an hydraulic cylinder 24 having an open-ended longitudinal through-bore in which work a pair of oppositely acting pistons 26, 27 for engagement with lugs 28 and 29 on the plates 5, 6. A pressure space defined in the bore between adjacent inner ends of the pistons 26 and 27 is connected to a master cylinder through a passage 32, and a bleed passage 33 also leads from the pressure space.

The cylinder 24 is integral with the inner end of a spigot 34 which depends from a mounting plate 35. The plate 35 closes the opening 20 and is detachably secured to the flange 17 by a least two circumferentially spaced bolts 36. A sealing gasket 37 is clamped between the mating faces of the plate 35 and the housing 4.

The longitudinal axis of the bore is tangential to the plates 5, 6, and also lies in a transverse plane parallel to the plane of each plate 5, 6.

Figure 6:
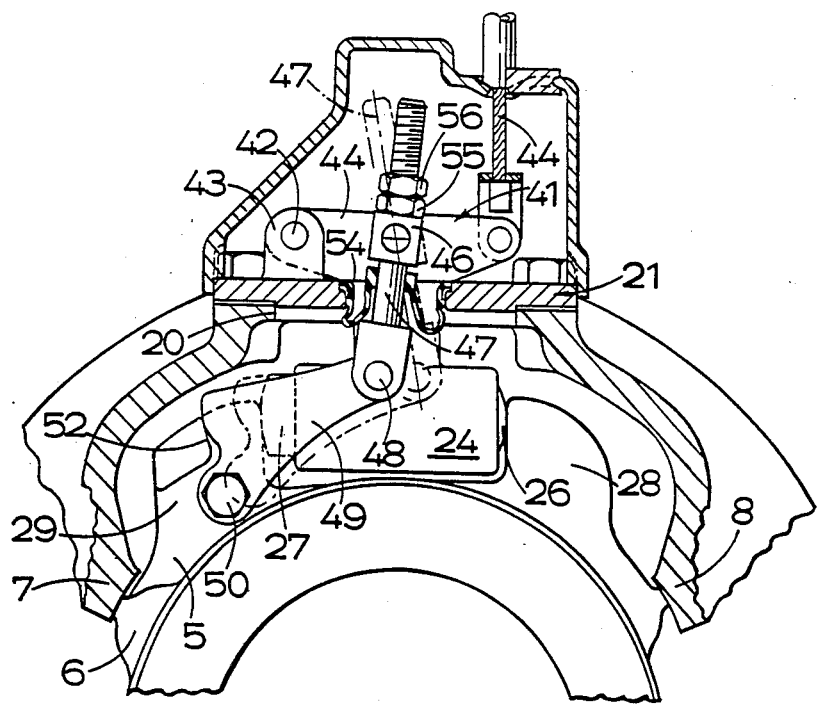
FIG. 6 shows the mechanism adjusted to a worn lining condition.

The mounting plate 35 provides a mounting for a mechanical brake-applying mechanism 40 for applying the brake manually for parking or in an emergency. As illustrated the brake-applying mechanism 40 comprises a bifurcated lever 41 which is pivotally connected at one end to opposite ends of a transverse pivot pin 42 which project from opposite sides of a lug 43 which is upstanding from the plate 35 and is disposed on one side of the projected area of the cylinder 24. The opposite end of the lever 41 is provided with an opening for connection to a brake-applying pull-rod or cable 44 (FIG. 6). A trunnion 45 is located at an intermediate point in the length of the lever 41, and the trunnion includes a block 46 which forms a pivotal mounting for the outer end of a pull-rod 47 of which the inner end is connected by a pin 48 to one arm of a bell-crank lever 49. The lever 49 is pivotally connected to the plate 6 by means of a pivot pin 50, and the lever has a part-circular nose 51 which cooperates with a face 52 on the lug 29 which is extended axially across the plate 6.

The pull-rod 47 extends into the brake through an opening 53 in the plate 35, and the opening 53 is closed by a resilient boot 54 of which the outer edge is secured to the plate 35 surrounding the opening 53 and the inner edge is secured to the rod 47. The pull-rod 47 also carries, in screw-threaded engagement at its outer end, an adjusting nut 55, which is in abutment with the block 46, and a lock nut 56.

When the brake is applied hydraulically by the master cylinder, the pistons 26 and 27 move in opposite directions to urge the lugs 28 and 29 relatively away from each other to initiate application of the brake as described above.

When the brake is applied manually, brake-applying force applied to the lever 41 moves the lever angularly about the pivot pin 42 as an axis. This withdraws the pull-rod 47, in turn causing the bell-crank lever 49 to move angularly about the pivot 50 and causing the two plates 5 and 6 to move angularly in opposite directions to initiate application of the brake, also as described previously.

As the linings of the friction discs 1 and 2 wear the effective length of the pull-rod 47 is reduced to compensate for such wear by screwing the nuts 55 and 56 inwardly.

The mechanism adjusted to a worn lining condition is illustrated in FIG. 6, with the relative positions of the components being illustrated in full lines when the brake is applied with the discs 1, 2 rotating in a forward direction and in chain-dotted lines with the discs rotating in a reverse direction. In both modes of operation the pull-rod 47 is substantially radially disposed. This is important since substantially equal forward and reverse brake factors can be achieved for parking or emergency braking.

Figure 7:
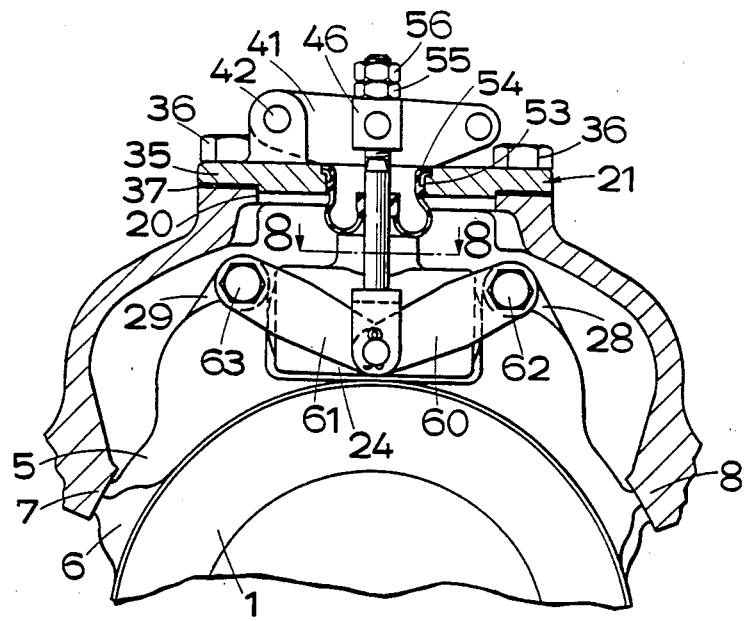
FIG. 7 is a view similar to FIG. 1 of a modified brake.
Figure 8:
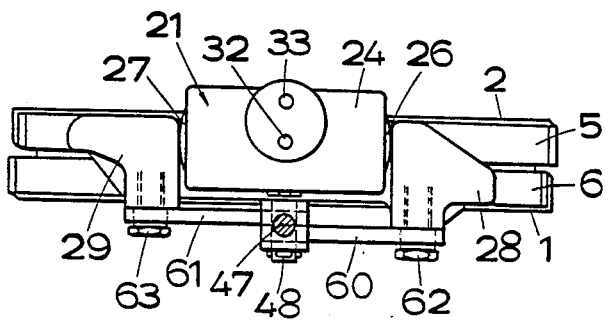
FIG. 8 is a section on the line 8—8 of FIG. 7.

In the brake illustrated in FIGS. 7 and 8 of the drawings, the bell-crank lever 49 is replaced by a pair of toggle links 60, 61, each of which is pivotally connected at its outer end to a respective one of the lugs 28, 29 by means of pivotal connections 62, 63.

When the brake is applied mechanically, movement of the pull-rod 47 is a radially outwards direction causes the outer ends of the toggle links 60, 61 to separate, in turn to urge the pressure plates 5, 6 angularly in opposite directions to initiate application of the brake.

The construction and operation of the brake of FIGS. 7 and 8 is otherwise the same as that of FIGS. 1 to 6, and corresponding reference numerals have been applied to corresponding parts.

Figures 9, 10:
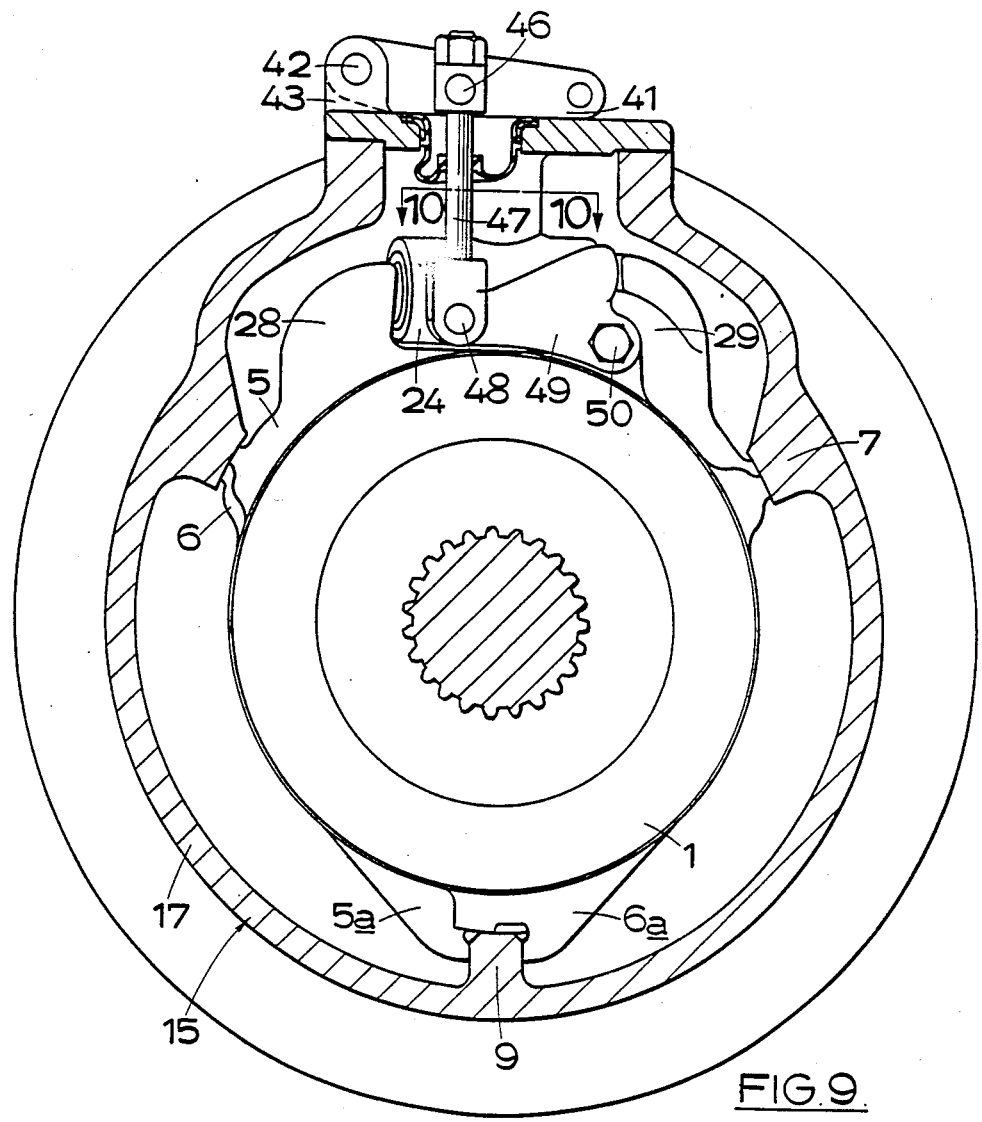
FIG. 9 is a view similar to FIG. 1 of another modified brake.
FIG. 10 is a section on the line 10—10 of FIG. 9.

In the brake illustrated in FIGS. 9 and 10 the longitudinal axis of the bore of the cylinder 24 also lies in plate which is angled with respect to a transverse plane parallel to the plane of each plate 5, 6, and the bell-crank lever 49 is similarly angled with respect to the plates to lie in a plane parallel to the said axis. In this construction the pivot pin 50 has a stem of conical profile which is received in a circular opening in the bell-crank lever 49 in order to align the lever 49, and the pin 50 is screwed into a tapped hole in the plate 6 which is normal to the plane of that plate, to facilitate manufacture.

When the brake is applied, either hydraulically or manually, due to the angles of inclination of the axis of the cylinder 24 and of the bell-crank lever 49, the input forces from the pistons 26 and 27 and the lever 49 act in directions to move the pressure plates 5, 6 both angularly and axially, thereby facilitating application of the brake.

The brake of FIGS. 9 and 10 is otherwise the same in construction and operation as that of FIGS. 1 to 6, and corresponding reference numerals have been applied to corresponding parts.

We claim:

1. A self-energising disc brake comprising a housing having a radial bore, first and second axially spaced braking surface in said housing, radial pilot lugs and a drag-taking stop abutment in said housing, first and second pressure plates centred on said pilot lugs, adjacent faces of said pressure plates being provided with co-operating oppositely inclined angularly spaced recesses, actuator lugs provided on said pressure plates, rolling bodies located in complementary pairs of said recesses, a rotatable friction member disposed between each said pressure plate and an adjacent said braking surface, each said member comprising a disc, and first and second linings of friction material for engagement with said pressure plate and said braking surface carried by opposite faces of said discs, and means for moving said pressure plates angularly relative to said housing to initiate application of said brake with said presure plates also moving axially to urge the friction members into engagement with said braking surfaces due to a tendency for said rolling bodies to ride up ramps defined by said recesses and constituting camming means, said plates being carried round with said discs until one of said plates is arrested by the engagement of an arresting lug on that plate with said drag-taking stop abutment, whereafter continued angular movement of the other of said plates provides a servo action, wherein said brake is provided with an actuator unit incorporating hydraulically-operable means and mechanically-operable means, and wherein said unit comprises a closure plate which is secured to said housing said closure plate having radially inner and outer faces and from one face of which a spigot extends radially inwards through said radial bore into the space defined by said housing, said spigot carrying at its radially inner end a cylinder body having a longitudinal bore of which the axis is tangential to the pressure plates, and at least one piston for co-operation with one of said actuator lugs working in said bore, and wherein said mechanically operable means is mounted on the other face of said closure plate.

2. A brake according to claim 1, wherein said bore extends between opposite ends of said body, and oppositely acting pistons working in the bore act between said actuator lugs.

3. A brake according to claim 1, wherein said unit is detachable mounted on the housing by means of detachable bolts acting to clamp said closure plate against a region of said housing which surrounds said radial bore.

4. A brake according to claim 3, wherein said mechanically-operable means includes a linkage, and said closure plate has an opening through which said linkage is accessible from the exterior of said housing.

5. A brake according to claim 4, wherein adjuster means are incorporated for adjusting the effective length of said linkage, and said adjuster means are also accessible from the exterior of the housing.

6. A brake according to claim 1, wherein said closure plate has an opening, and said mechanically-operable means comprises a pull-rod which extends into said brake through said opening in said closure plate and has an outer end to which brake-applying means are coupled, and an inner end cooperating with operating means for causing relative movement of said pressure plates in opposite directions in response to movement of said pull-rod in a substantially radially outwards direction.

7. A brake according to claim 6, wherein said brake-operating means comprises a bell-crank lever which is pivotally mounted on one of the pressure plates, pivotally connected to the inner end of the pull-rod, and has a part-circular nose adapted to cooperate with a face on the other of said pressure plates.

8. A brake according to claim 7, wherein said longitudinal axis of said bore also lies in a plane which is angled with respect to a transverse plane parallel to the plane of each said pressure plate, and said bell-crank lever is similarly angled to lie in a plane parallel to the said longitudinal axis.

9. A brake according to claim 8, wherein said bell-crank lever is pivotally connected to the said one pressure plate by means of a pivot pin, and said pivot pin has a stem of conical profile which is received in a circular opening in said bell-crank lever.

10. A brake according to claim 6, wherein said brake-operating means comprises a pair of toggle links of which the outer ends are pivotally coupled to the pressure plates, and the inner ends are both pivotally connected to the inner end of said pull-rod.

11. A brake according to claim 6, wherein said brake-applying means comprises a lever which is pivotally connected at one end to said closure plate, at the opposite end to brake actuating means, and at an intermediate point in its length to said outer end of said pull-rod.

12. A self-energising disc brake comprising a housing, first and second axially spaced braking surfaces in said housing, radial pilot lugs and a drag-taking stop abutment in said housing, first and second pressure plates centered on said pilot lugs, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plate and said braking surface carried by opposite faces of said discs, and means for moving said pressure plates angularly relative to said housing to initiate application of said brake with said pressure plates also moving axially to urge the friction members into engagement with said braking surfaces due to a tendency for said rolling bodies to ride up ramps defined by said recesses and constituting camming means, said plates being carried round with said discs until one of said plates is arrested by the engagement of a lug on that plate with said drag-taking stop abutment, whereafter continued angular movement of the other of said plates provides a servo action, wherein said brake is provided with an actuator unit incorporating hydraulically-operable means and mechanically-operable means, and wherein said unit comprises a closure plate which is secured to said housing and provides a mounting for both said means, said closure plate having radially inside and outside faces, and said housing has a radial bore through which both said means extend into said brake, said hydraulically-operable means being mounted on the inside face of said closure plate and acting between actuator lugs on the pressure plates and comprising a cylinder body having a longitudinal bore of which the axis is tangential to the plates, and at least one piston for co-operation with one of said actuator lugs working in said bore, said closure plate having a mounting lug provided on its outside face by which one end of a lever is pivotally mounted on said closure plate, the other end of said lever being coupled to mechanical brake-applying means, a pull-rod being pivotally connected to said lever at an intermediate point in the length of said lever, said pull-rod extending through an aperture in said closure plate and through said radial bore to co-operate with operating means for causing relative movement of said pressure plates in opposite directions in response to movement of said pull-rod in a substantially radially outwards direction.

13. A brake according to claim 12, wherein said bore extends between opposite ends of said body, and oppositely acting pistons working in the bore act between said actuator lugs.

14. A brake according to claim 12, wherein said unit is detachably mounted on the housing by means of detachable bolts acting to clamp said closure plate against a region of said housing which surrounds said radial bore.

15. A brake according to claim 12, wherein adjuster means are incorporated for adjusting the effective length of said pull-rod, and said adjuster means are accessible from the exterior of the housing.

16. A brake according to claim 12, wherein said brake-operating means comprises a bell-crank lever which is pivotally mounted on one of said pressure plates, pivotally connected to the inner end of the pull-rod, and has a part-circular nose adapted to co-operate with a face on the other of said pressure plates.

17. A brake according to claim 16, wherein said longitudinal axis of said bore also lies in a plane which is angled with respect to a transverse plane parallel to the plane of each said pressure plate, and said bell-crank lever is similarly angled to lie in a plane parallel to the said longitudinal axis.

18. A brake according to claim 17, wherein said bell-crank lever is pivotally connected to the said one pressure plate by means of a pivot pin, and said pivot pin has a stem of conical profile which is received in a circular opening in said bell-crank lever.

19. A brake according to claim 12, wherein said brake-operating means comprises a pair of toggle links of which the outer ends are pivotally coupled to the pressure plates, and the inner ends are both pivotally connected to the inner end of said pull-rod.

20. A self-energising disc brake comprising a housing having a radial bore, first and second axially spaced braking surfaces in said housing, radial pilot lugs and a drag-taking stop abutment in said housing, first and second pressure plates centred on said pilot lugs, adjacent faces of said pressure plates being provided with co-operating oppositely inclined angularly spaced recesses, actuator lugs provided on said pressure plates, rolling bodies located in complementary pairs of said recesses, a rotatable friction member disposed between each said pressure plate and an adjacent said braking surface, each said member comprising a disc, and first and second linings of friction material for engagement with said pressure plate and said braking surface carried by opposite faces of said discs, and means for moving said pressure plates angularly relative to said housing to initiate application of said brake with said pressure plates also moving axially to urge the friction members into engagement with said braking surfaces due to a tendency for said rolling bodies to ride up ramps defined by said recesses and constituting camming means, said plates being carried round with said discs until one of said plates is arrested by the engagement of an arresting lug on that plate with said drag-taking stop abutment, whereafter continued angular movemnt of the other of said plates provides a servo action, wherein said brake is provided with an actuator unit incorporating hydraulically-operable means and mechanically-operable means, and wherein said unit comprises a closure plate which is secured to said housing, said closure plate having radially inner and outer faces and from one face of which a spigot extends radially inwards through said radial bore into the space defined by said housing, said spigot carrying at its radially inner end a cylinder body having a longitudinal bore of which the axis is tangential to the pressure plates, and at least one piston for cooperation with one of said actuator lugs working in said bore, said mechanically operable means is mounted on the other face of said closure plate, and wherein said longitudinal axis of said bore lies in a plane which is angled with respect to a transverse plane parallel to the plane of each of said pressure plates.

* * * * *